May 21, 1974        E. R. FRYER        3,812,008

SEAL RING FOR NUCLEAR REACTORS

Filed May 20, 1970

INVENTOR
EDWARD R. FRYER

BY *John J. Byrne*

ATTORNEY

United States Patent Office 3,812,008
Patented May 21, 1974

3,812,008
SEAL RING FOR NUCLEAR REACTORS
Edward R. Fryer, 506 Magnolia Ave.,
Frederick, Md. 21701
Filed May 20, 1970, Ser. No. 39,027
Int. Cl. G21c 19/02
U.S. Cl. 176—30                               1 Claim

ABSTRACT OF THE DISCLOSURE

An inflatable seal ring for use between the annular surface of a nuclear reactor vessel and its surrounding biological shield, which forms part of the housing for the reactor vessel. The seal is used during refueling of the vessel to prevent water maintained in the refueling canal above the reactor vessel from entering the reactor cavity.

---

This invention relates to a nuclear reactor assembly and more particularly to an inflatable seal ring for use during reactor refueling periods.

In a general manner, nuclear reactor assemblies include a fuel containing reactor vessel which is suitably supported in a protective housing which includes a biological shield. The biological shield forms a right cylinder around the reactor vessel external surface and is spaced from the vessel to define what is referred to as the reactor cavity. A reactor refueling canal above the reactor vessel, is designed to contain a protective pool of water of substantial depth to protect personnel against radiation during periods when the reactor vessel is open for refueling. The reactor refueling canal communicates with an underwater storage pit by means of a conduit or refueling canal. The storage pit contains not only spent fuel assemblies but also new fuel assemblies ready to be moved through the canal and into the vessel which operation is referred to as refueling. Elaborate mechanized equipment is used during refueling to make the operation safe and readily performed by a minimum of personnel. As mentioned, the area above the vessel includes the reactor refueling canal. During operation, the refueling canal and the reactor cavity are in communication, there being no need for a protective pool of water in the cavity since the vessel closure is in place. It is during refueling that the seal with which this invention is concerned, is placed at the juncture of the reactor cavity and the refueling canal to maintain the reactor cavity in a dry condition.

Generally, the refueling operation is begun by shutting down the reactor and all systems associated with the normal operation of the reactor. Following this, among other operations, the seal ring is placed in position and then inflated, thus providing a water-tight seal between the vessel and the biological shield at a point just below the vessel closure. The area above the seal and above the vessel, namely, the reactor refueling canal, is filled with water to a suitable depth to protect personnel against radiation once the vessel closure is open. The reactor closure head is removed and the spent fuel assemblies are removed therefrom and conveyed under water to a suitable storage area. New fuel assemblies are subsequently inserted in the reactor vessel and the closure is replaced. The reactor cavity can then be drained and the seal removed. Normally the refueling operation takes from two to three weeks.

This invention is primarily concerned with the seal rings used to separate the reactor cavity from the refueling canal. The seal rings of the prior art comprise very heavy flat metal rings of a very expensive corrosion resistant metal, which rings span the distance between a seal flange projecting radially, outwardly about the periphery of the reactor vessel and the upper ledge of the biological shield, to effect a seal between the refueling canal area and the reactor cavity. The ring is provided with elastomeric seal means on its underside for contact with the seal flange and biological shield respectively. Elaborate clamping and hold-down devices are used to apply pressure to the metal ring and, therefore, to the elastomeric material to effect the necessary seal. These prior art seal rings are very costly to manufacture in that expensive corrosion-resistant materials are needed and the ring must be machined to very close tolerances. Additionally, in some reactors the seal is left permanently in place because of handling and storing difficulties due to its size and weight. This is understandable since through repeated use of the seal drastically shortens its life as a result of wear and exposure.

It is an object of this invention to overcome the above-mentioned disadvantages in seal rings of the prior art.

More specifically, it is an object of this invention to provide a seal design which may be fabricated using a relatively inexpensive material. The seal ring will be made of readily available materials of the type which resists corrosion.

It is still another object of the invention to provide a seal ring which is extremely easy to handle relative to a flat metal seal ring and which can be easily folded into a compact configuration for storage between refueling operations.

It is another object of this invention to provide a resilient seal ring which adjusts itself due to its expandable qualities to irregularities between the reactor vessel and its biological shield to effect a tight seal over a substantially wide range of structural misalignments.

More specifically, the seal ring of this invention comprises a hollow annulus of a rubber-like material, and in cross-section, includes substantially vertically extending sidewalls joined together by top and bottom convex walls. Preferably, the inflatable annulus is of a laminated fabric and elastomeric material of a desired thickness to withstand a range of pressures which is exerted upon the seal. The material is of the type that will operate under temperature conditions between 100° F. and 200° F. The seal, as mentioned earlier, can be folded or otherwise stored and is used by placing it in an uninflated horizontal position between the vessel and the cavity and then inflating it to approximately 15 p.s.i.

These and other objects of the invention will become more apparent to those skilled in the art by references to the following detailed description when viewed in light of the accompanying drawings wherein.

Figure 1:
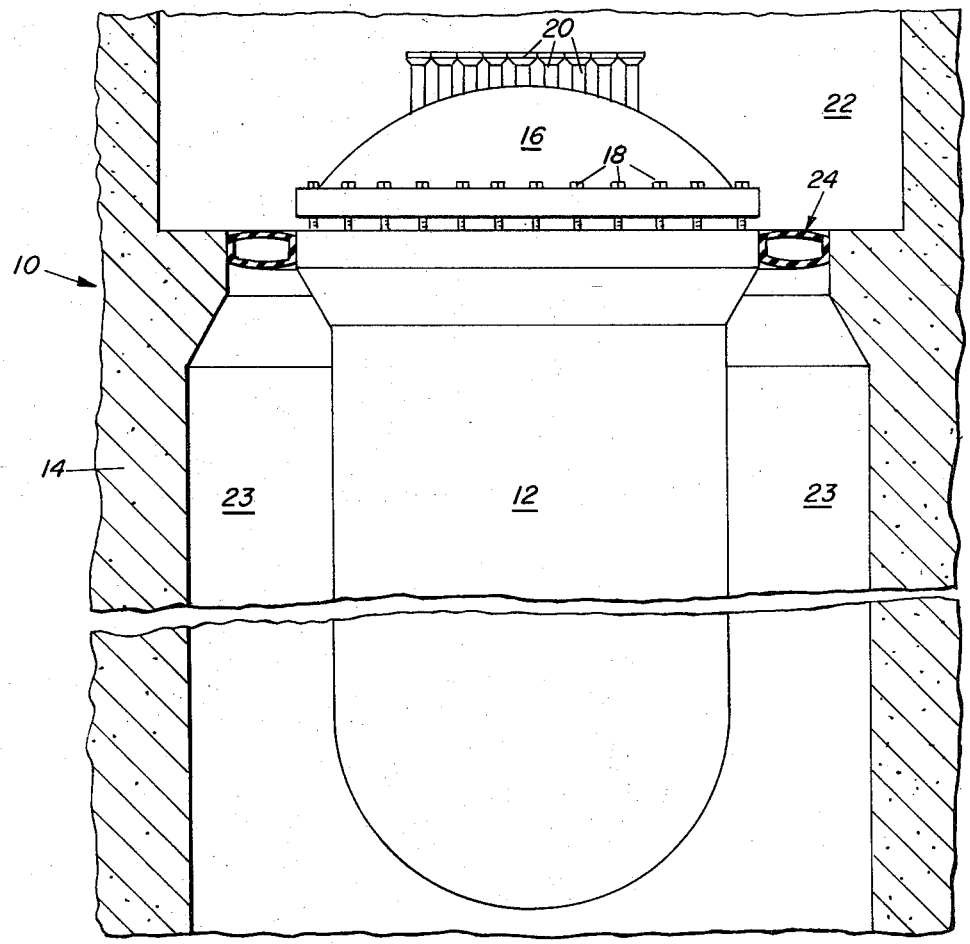
FIG. 1 is an elevational view partly in cross-section of a reactor vessel and a surrounding biological shield with the seal of this invention in position.

Referring now to FIG. 1 wherein the like numerals indicate like parts, the numeral 10 generally indicates the nuclear reactor assembly of this invention which includes a reactor vessel 12 and a biological shield 14 which surrounds the vessel 12. Though not shown, it is to be understood that the vessel 12 is supported by suitable means extending between the vessel and the biological shield 14. The reactor vessel is equipped with a closure head 16 normally positioned on the vessel and is secured thereto by bolts 18. The reactor vessel which contains the fuel assemblies and control rods is conventional in the art. The closure head 16 includes control rod mechanism housings 20 which provide access to the control rods inside of vessel 12.

The biological shield 14 encircles the reactor vessel and extends upwardly to a point just below where the closure head 16 engages the vessel 12. The area above the biological shield, generally indicated by the numeral 22, is the reactor refueling canal. The area below the level of the biological shield 14 and defined by the space between the vessel and the biological shield is called the reactor cavity.

Figures 2, 3:
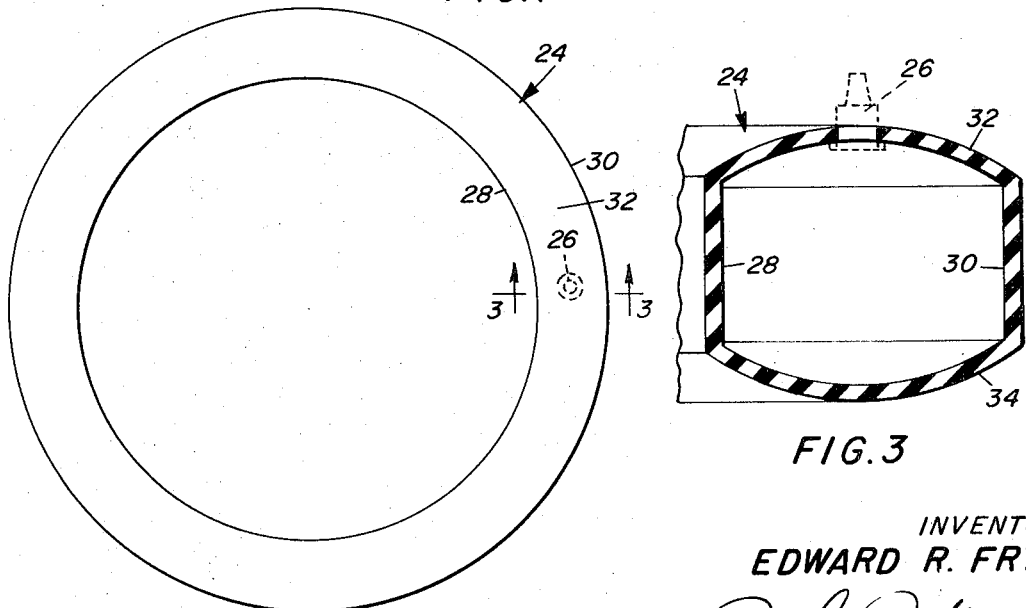
FIG. 2 is a top plan view of the seal of this invention.
FIG. 3 is a cross-sectional view taken on lines 3—3 of FIG. 2.

The seal of this invention is indicated by the numeral 24 and is in the form of an annulus and is positioned between the biological shield 14 and the outer annular surface of the vessel 12 at a point just below the vessel closure head 16. The seal is hollow in cross-section and is inflatable for purposes of effecting a tight seal between the vessel 12 and the biological shield 14 and is constructed of a reinforced rubber-like material. A valve or other suitable inflating means is generally indicated by the numeral 26 and is shown in phantom. It is to be understood that any conventional valve mechanism can be used for inflating and deflating the seal ring. The seal ring, as shown in the cross-sectional view of FIG. 3, includes substantially parallel vertically extending side walls 28 and 30 which are joined by top and bottom convex walls 32 and 34. The rubber-like material is designed to operate in the area of temperatures between 100° F. and 200° F.

The seal ring of this invention is to be used during the refueling of the reactor vessel 12. Generally, in refueling operations, the transfer of the spent fuel assemblies and the substitution of new fuel assemblies is done under a substantial depth of water which acts as a shield against radiation. Therefore, as one of the first steps in the refueling operation, the seal ring 24 must be positioned between the refueling canal 22 and the reactor cavity 23 so that the cavity may be filled with water above the reactor vessel closure head. The seal ring is preferably inflated to a pressure of 15 p.s.i. after it has been positioned horizontally between the reactor vessel 12 and the biological shield 14. The canal 22 is then filled with water and the reactor closure head 16 may be safely removed permitting access to the fuel assemblies within the vessel 12. As is conventional in the art, the fuel assemblies are transferred underwater to a storage pit for spent fuel assemblies. New fuel assemblies are introduced to the vessel from the storage pit via the canal. All the while, the seal ring 24 seals the area between the reactor refueling canal 22 and the reactor cavity 23. The refueling period lasts approximately 2 to 3 weeks after which time the closure head is replaced, refueling canal 22 is drained and the seal 24 is then deflated and removed.

The ease of handling the relatively light inflatable seal 24 can easily be appreciated. It is to be understood that once deflated it can be folded or otherwise compactly stored for use during subsequent refueling operations.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claim.

What is claimed is:

1. A method of refueling a nuclear reactor vessel having a closure head and which is mounted in a housing assembly including a biological shield defining a reactor cavity about said vessel below said closure head and a reactor refueling canal above said closure head, comprising the steps of positioning an inflatable seal between said vessel and said biological shield below said closure, inflating said seal to tightly seal said reactor cavity from said refueling canal, and forming a pool of water in said refueling canal above said reactor vessel, removing said closure head and replacing spent fuel assemblies in said reactor vessel.

References Cited
UNITED STATES PATENTS

| | | | |
|---|---|---|---|
| 3,514,115 | 5/1970 | Gallo | 176—87 X |
| 2,685,071 | 7/1954 | McCreary | 220—46 P X |
| 3,464,581 | 9/1969 | Polcer | 220—46 P |
| 3,578,564 | 5/1971 | Fletcher III | 176—87 |

CARL D. QUARFORTH, Primary Examiner

E. E. LEHMANN, Assistant Examiner

U.S. Cl. X.R.

176—87